United States Patent
Preston et al.

[11] 3,724,077
[45] Apr. 3, 1973

[54] MIXING SYRINGE

[75] Inventors: Leonard A. Preston, Monrovia; Seymour J. Shriver, Glendora, both of Calif.

[73] Assignee: Unitek Corporation, Monrovia, Calif.

[22] Filed: Nov. 26, 1971

[21] Appl. No.: 202,089

[52] U.S. Cl. .................................................32/60
[51] Int. Cl. .............................................A61c 5/04
[58] Field of Search..........32/60, 40 A; 222/412, 413

[56] References Cited

UNITED STATES PATENTS 3,552,023   1/1971   Osbeck....................................32/60
3,618,216   11/1971  Jaeger......................................32/60

Primary Examiner—Robert Peshock
Attorney—Russell R. Palmer, Jr. et al.

[57] ABSTRACT

A syringe for mixing and dispensing compounds or mixtures such as dental impression materials. Components of the material to be mixed are placed in a disposable cup which is attached to the syringe. A plunger knob on the syringe is next repeatedly depressed against a return spring to drive a rotating slotted mixing plate back and forth through the material to effect mixing. A pair of handles on the syringe are then squeezed toward each other to force the mixed material out of a nozzle on the cup.

12 Claims, 5 Drawing Figures

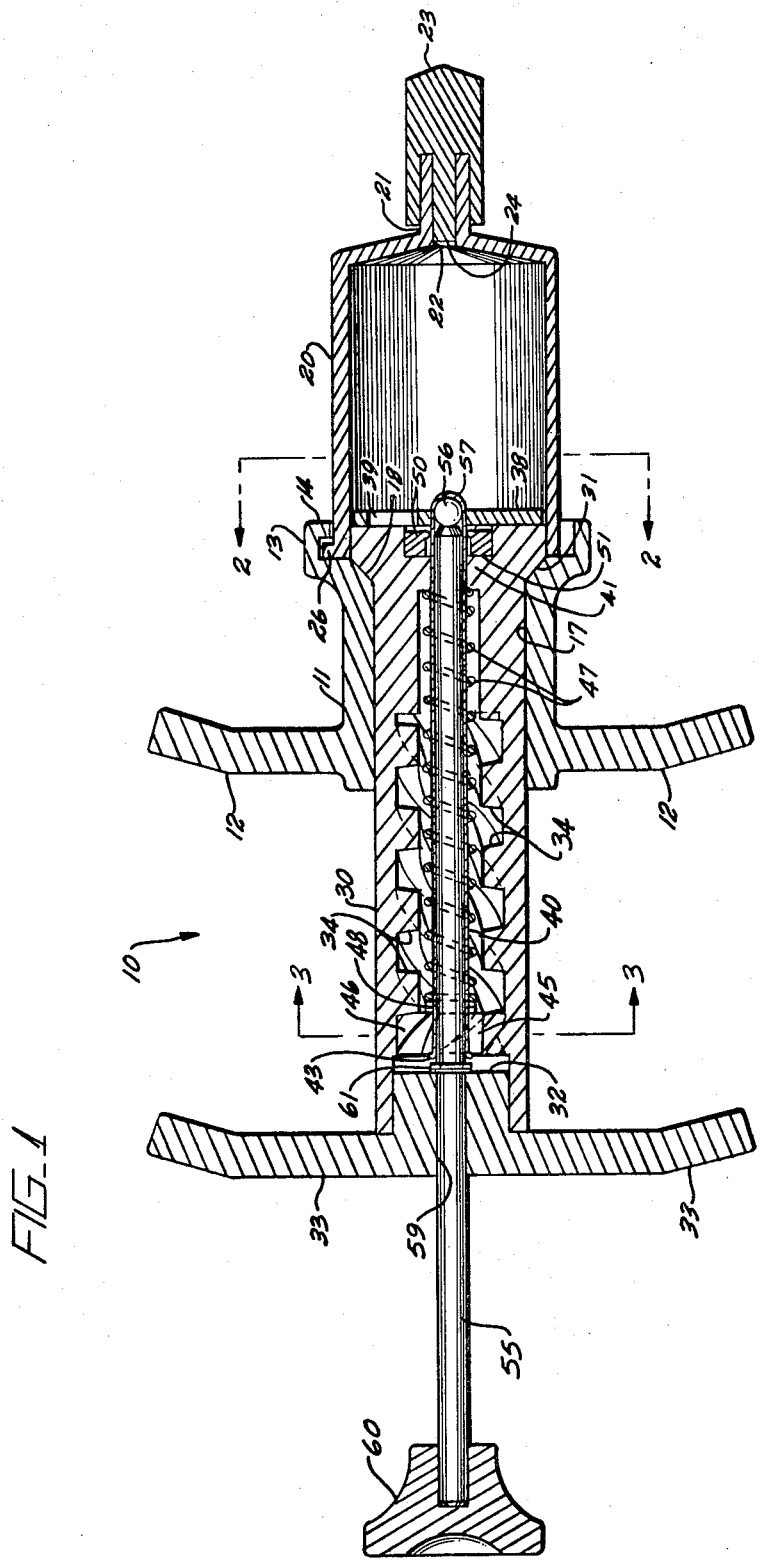

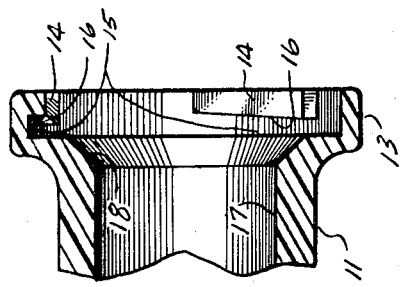
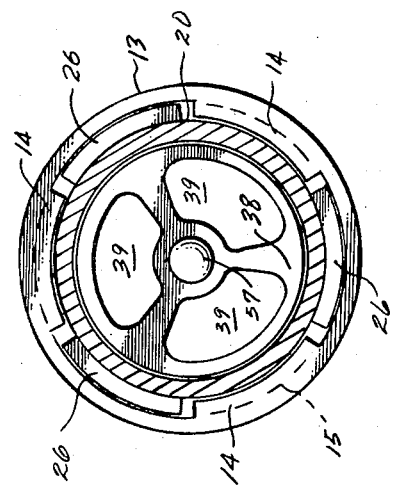
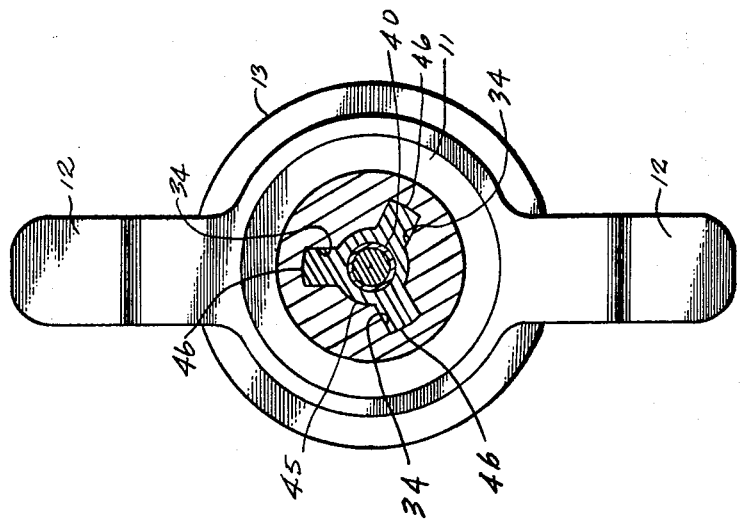
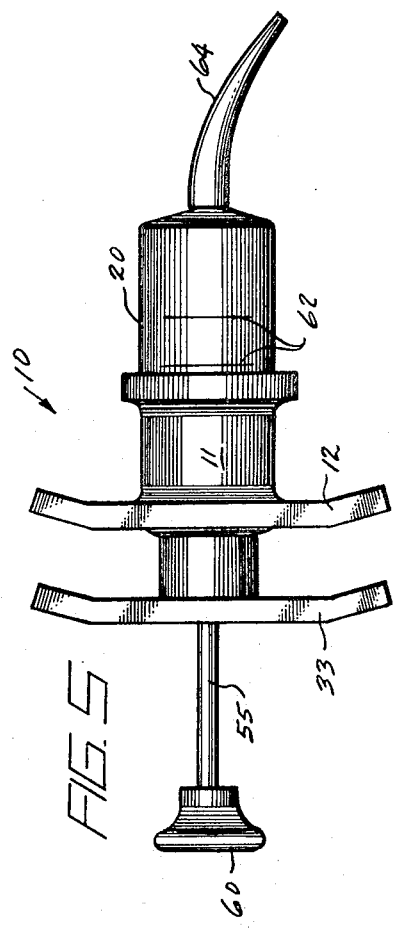

MIXING SYRINGE

BACKGROUND OF THE INVENTION

Multicomponent impression materials have long been used in dentistry to make an impression or mold of a tooth undergoing restorative treatment. A number of elastomers have been developed for this purpose, and are usually formed from a base material and a catalyst or accelerator. These components are combined just before the impression is taken, and the resulting material is applied to the tooth being restored either directly or in an impression tray which permits the dentist to obtain a mold of part or all of a dental arch. The impression material quickly sets to form a mold in which a model of the tooth or teeth can be cast.

It is important that the impression-material components be mixed quickly and very thoroughly to insure a dimensionally stable molding material with predictable and repeatable characteristics in each batch. Conventional mixing procedure involves manual blending of the components in a cup or on a plate, the mixed batch then being transferred to a syringe for injection around a tooth. This procedure does not provide consistent mixing, and is a messy operation requiring cleanup and usually involving some loss of material during transfer to the syringe. The procedure is also slow, and the impression material may take a premature partial set before being applied to the tooth, leading to an inaccurate mold.

Some of these problems are alleviated by recently introduced syringes which permit mixing and dispensing in a single container. The material components are placed in the container which is attached to the syringe, and a plate or vane is reciprocated through the components to mix them together. These syringes, however, do not provide thorough consistent mixing which is essential to the preparation of batches of impression materials having consistent properties from batch to batch.

The mixing syringe of this invention includes a dasher or mixing plate which provides uniform blending of the material components. The mixing plate is coupled through a rotation-inducing mechanism to a plunger shaft which is reciprocated by the user. Simple linear motion of the shaft drives the mixing plate back and forth through the material components, while simultaneously automatically rotating the plate through a repeatable path for each stroke of the shaft. This combined linear and rotary motion of the plate has been found to provide superior mixing of the material components, and consistent properties of the final material are easily achieved from batch to batch.

SUMMARY OF THE INVENTION

The syringe of this invention includes a hollow housing adapted to engage and hold a cup containing components of a material to be mixed and dispensed. A hollow piston is slidably mounted in the housing, and a shaft is slidably mounted on and extends from an outer end of the piston. A mixing member, which is preferably an apertured disk, is supported adjacent an inner end of the piston by a mounting means which is slidably mounted on the piston in contact with the shaft. Linear movement of the shaft into the piston drives the mixing plate from a retracted position (against the inner end of the piston) into the mixing cup and through the material components.

The mounting means includes a rotary drive means coupled to the piston and operative to rotate the mixing member when the shaft is moved linearly. The shaft and mounting means are not rotatably connected, whereby the shaft can be moved purely in translation to effect both translation and rotation of the disk. The piston and retracted mixing plate are movable as a unit with respect to the housing to force material through the cup after mixing is complete.

DESCRIPTION OF THE DRAWINGS

FIG. 1 is a sectional elevation of a syringe according to the invention;

FIG. 2 is a view on line 2—2 of FIG. 1;

FIG. 3 is a view on line 3—3 of FIG. 1;

FIG. 4 is a sectional elevation of a portion of a housing used in the syringe; and FIG. 5 is a view of the syringe showing the placement of components after mixed material has been expelled from the syringe through a nozzle.

DESCRIPTION OF THE PREFERRED EMBODIMENT

A syringe 10 according to the invention is shown in FIG. 1, and includes a hollow cylindrical housing 11 having a pair of gripping handles 12 extending therefrom. A forward end 13 of the housing is enlarged in diameter, and defines three inwardly extending flanges 14 which form a segmented channel 15 (FIGS. 2 and 4). Inner surfaces 16 of flanges 14 are tapered or cam shaped, and segmented channel 15 is in effect a segmented thread or locking channel. Housing 11 has a smooth cylindrical inner bore 17 which tapers outwardly at its forward end to form a shoulder 18.

A material-receiving cup 20 is generally cylindrical, and tapers inwardly at a forward end to define a forwardly extending tube 21 having an outlet passage 22 therethrough. A closure cap 23 makes a press fit over tube 21, and has a plug 24 extending into outlet passage 22 to close the forward end of the cup.

The rear end of cup 20 includes three integrally formed radially extending segments or flanges 26 (FIG. 2) which are spaced to fit between flanges 14 on housing 11. The cup is mounted on housing 11 by positioning flanges 14 and 26 as shown in FIG. 2, and then rotating the cup to jam flanges 26 in channel 15 against cam-shaped inner surfaces 16 of flanges 14.

A cylindrical ejector piston 30 makes a slip fit within bore 17 of housing 11. Piston 30 tapers outwardly at its forward or inner end to define a shoulder 31 which abuts shoulder 18 of the housing to limit rearward travel of the piston. The ejector piston is hollow, and a hub 32 having a pair of gripping handles 33 extending therefrom is cemented or otherwise rigidly secured within a rear or outer end of the piston. A portion of the inner surface of the piston defines a multiple-lead female helical thread 34. In a preferred form, three such threads are provided to form a multiple-lead thread with a linear pitch of 0.333 inch and a lead of one inch.

A circular mixing member or plate 38 (FIGS. 1 and 2) makes a loose fit within cup 20, and the plate has three annulus-segment apertures or openings 39 therethrough. An elongate hollow tube 40 extends slightly through a central opening in the mixing plate, and is brazed or otherwise rigidly secured to the plate to provide a mounting means for the plate. Tube 40 extends rearwardly into hollow piston 30, and makes a slip fit through an inwardly extending shoulder 41 integrally formed within the piston. Tube 40 terminates at a rear or outer end 43 within the piston and positioned adjacent the beginning of multiple-lead thread 34.

A rotary means such as a rotor or follower member 45 (FIGS. 1 and 3) is rigidly secured around end 43 of tube 40, and has three male threads 46 extending radially therefrom to form a male multiple-lead thread mating with female thread 34 in the piston. The follower member is cemented or otherwise rigidly secured to the periphery of tube 40, and end 43 of the tube is also flared or swedged against the follower member (FIG. 1) to hold the components together.

A compression coil spring 47 (FIG. 1) is positioned around tube 40 within piston 30, and the forward end of the spring bears on a rear face of shoulder 41. The opposite end of the spring bears against a pair of washers 48 which are seated on follower member 45. A resilient seal 50 is seated in a recess 51 at the forward end of piston 30, and the seal bears against the periphery of tube 40.

An elongate cylindrical shaft 55 makes a slip fit within tube 40 and seats against a ball 56 at a closed forward end 57 of the tube. Shaft 55 extends rearwardly to make a slip fit through a central opening 59 in hub 32. A knob 60 is rigidly secured at a rear or outer end of shaft 55. A C-ring retainer 61 is fitted on shaft 55 to limit rearward motion of the shaft to the position shown in FIG. 1.

Housing 11, cap 23, hub 32, follower member 45 and knob 60 are preferably molded from a plastic material such as nylon. Cup 20 is preferably molded from polyethylene plastic, and seal 50 is formed from polytetrafluoroethylene plastic (sold under the trademark "Teflon"). Mixing plate 38, tube 40 and shaft 55 are preferably made of stainless steel.

In operation, the components of a material to be mixed and dispensed are first loaded into cup 20. The cup preferably includes graduations or lines 62 (FIG. 5) to guide the user in the amount of material to be loaded. The cup is then secured to housing 11 as described above, and plug 24 is checked to insure that it is securely in place.

The user then grips the syringe by handles 33, and depresses knob 60 to drive shaft 55 forwardly toward the front of the cup. This motion forces mixing plate 38 forwardly through the cup and the materials contained therein, as the shaft bears directly on ball 56 at the end of tube 40, and the tube in turn is rigidly secured to the mixing plate.

As the mixing plate and tube are driven forwardly by the shaft, follower member 45 is carried along with the tube and is forced to rotate as threads 46 follow threads 34. As the follower member is rigidly secured to the tube, this rotary motion is transmitted through the tube to the mixing plate. The rotary motion, however, is isolated from shaft 55 because tube 40 rotates freely around the shaft. Knob 60 thus remains stationary under the user's thumb during a mixing operation, and does not tend to rotate with the internal parts of the syringe.

When the mixing plate is driven forwardly through a full stroke to the bottom or forward end of cup 20, pressure on knob 60 is relaxed and the moving parts of the syringe are returned to the original retracted position (shown in FIG. 1) by return spring 47. Pressure is then again applied to knob 60 to cycle the mixing plate back and forth repeatedly through the materials in the cup. These materials are extruded through openings 39 in the mixing plate, and thin materials may also flow around the periphery of the mixing plate as it reciprocates within the cup.

The combined linear and rotary motion of the mixing plate has been found to produce a rapid and thorough stirring or mixing action of the several components of the material being handled. The rotary motion is produced automatically as the knob is moved linearly, and the knob does not twist under the user's thumb. The segmented-annulus shape of openings 39 in the mixing plate have been found to produce particularly efficient mixing of components used to prepare dental impression materials.

Seal 50 prevents any of the materials being mixed from flowing into the interior of ejector piston 30 during the rearward or return stroke of the mixing plate. As best seen in FIG. 1, the front surface of this seal is recessed slightly below the forward end of the ejector piston to prevent the mixing plate from bearing directly against the seal and extruding material therethrough.

After the material has been thoroughly mixed by an appropriate number of strokes of the mixing plate, closure cap 23 is removed from the end of cup 20 and the mixed material is ready to be dispensed. If desired, an accessory nozzle 64 as shown in FIG. 5 can be fitted over tube 21 of the cup to guide the mixed material to a specific location. This nozzle is particularly useful when dental impression material is being mixed, and the material is to be dispensed around a tooth undergoing restorative treatment.

Dispensing of the material is accomplished by squeezing handles 12 and 33 toward each other to force ejector piston 30 forwardly in cup 20. During this operation, mixing plate 38 is in the rearward or fully retracted position as shown in FIG. 1. The mixing plate and piston thus move forward in the cup as a unit, forcing the mixed material through outlet passage 22 into nozzle 64. When the mixing plate bottoms at the forward end of the cup, the operating handles are in the position shown in FIG. 5, and all of the mixed material has been dispensed from the cup.

Although cup 20 may be reused repeatedly, it will often be convenient to dispose of the cup after each use to eliminate cleaning. One of the components of a multi-component material may also be packaged in the cup, and the other component added thereto immediately prior to mixing. The cup is inexpensively molded from plastic, can be treated as a disposable throwaway item.

There has been described a mixing and dispensing syringe which is particularly suitable for handling multi-component dental impression materials. The syringe is fast and easy to use, and produces thorough mixing of the material components. When mixing is complete, dispensing of the material is readily accomplished simply by shifting the position of the hands on the syringe to urge the operating handles together.

What is claimed is:

1. A syringe for mixing and dispensing a material formed from several components which are mixed together before the material is used, comprising:
   a hollow housing adapted to engage and hold a cup containing the material components;
   a hollow piston slidably mounted within the housing;
   a shaft slidably mounted in and extending from a first end of the piston;
   a mixing member; and
   a mounting means secured to the mixing member and slidably mounted in the piston in contact with the shaft whereby linear movement of the shaft into the piston drives the mixing plate from a retracted position against a second end of the piston into the mixing cup and through the material components, the mounting means including rotary means coupled to the piston and operative to rotate the mixing member when the shaft is moved linearly,
   the piston and retracted mixing plate being movable as a unit with respect to the housing to force the material through the cup after mixing is complete.

2. The syringe defined in claim 1 in which the mounting means is rotationally free with respect to the shaft whereby rotation of the mixing plate does not cause shaft rotation as the shaft is moved linearly.

3. The syringe defined in claim 2 and further comprising a return spring disposed between the piston and mounting means to urge the mixing member into a retracted position.

4. The syringe defined in claim 3 in which the mixing member is a slotted disk, and in which the rotary means and piston include mated helically threaded portions for rotating the disk.

5. A syringe for mixing and dispensing compositions such as a dental impression material prepared from several components which are blended just before the material is to be used, comprising:
   a cup for holding the material components and having an open end and a capped end with a releasable closure;
   a hollow housing releasably engaged with the cup over the open end thereof;
   a piston slidably fitted in and extending out of the housing away from the cup, the piston having an inner end extending into the cup when the piston is moved toward the capped end;
   a mixing plate disposed between the inner end of the piston and the capped end of the cup;
   a mounting means secured to the mixing plate and movably mounted on the piston so linear movement of the mounting means moves the mixing plate from a retracted position against the inner end of the piston to an extended position adjacent the capped end of the cup, the mounting means including rotary means coupled to the piston and operative to cause rotation of the mixing plate as it is moved between the retracted and extended position; and
   a shaft slidably mounted on the piston in contact with the mounting means, and extending from an outer end of the piston to be linearly movable to drive the mounting means and mixing plate, the shaft and mounting means being rotationally free with respect to each other whereby mixing-plate rotation induced by the rotary means is isolated from the linearly movable shaft.

6. The syringe defined in claim 5 and further comprising a return spring disposed between the piston and mounting means, and operative to urge the mixing plate toward the retracted position.

7. The syringe defined in claim 6 in which the housing and piston each have handles extending therefrom, the mixing plate is a disk with a plurality of apertures therethrough, the mounting means includes a tube rigidly secured to the mixing-plate disk and slidably mounted on the piston, the shaft being received in the tube in linear driving relationship, and the rotary means comprises a threaded follower rigidly secured to the tube, the piston having a threaded portion receiving the follower whereby the follower, tube and disk are rotated as the tube is linearly driven by the shaft.

8. The syringe defined in claim 5 in which the housing and piston each have handles extending therefrom, and the shaft includes a knob at its outer end, whereby mixing is performed by gripping the syringe to reciprocate the knob with respect to the piston handle, and dispensing of the mixed material is performed by removing the cup closure and drawing the housing and piston handles together to drive the piston and retracted mixing plate into the cup to expel material therefrom.

9. The syringe defined in claim 5 in which the mounting means includes a hollow tube having a closed end rigidly secured to the mixing plate, the piston defining a bore in which the tube is slidably fitted, and a ball disposed in the tube at the closed end, the shaft being fitted within the tube to bear against the ball, and further comprising a return spring disposed between the piston and mounting means to urge the mixing plate toward the retracted position.

10. The syringe defined in claim 9 in which the rotary means comprises a follower having external threads and being rigidly secured to the tube, the piston bore defining mating threads receiving the follower threads.

11. The syringe defined in claim 10 and further comprising a seal disposed around the tube and seated at the inner end of the piston.

12. The syringe defined in claim 5 in which the cup is generally cylindrical and the mixing plate is a circular disk having a diameter slightly smaller than an inside diameter of the cup, the disk including a plurality of apertures therethrough.

* * * * *